US008843243B2

(12) United States Patent
Szelewa

(10) Patent No.: US 8,843,243 B2
(45) Date of Patent: Sep. 23, 2014

(54) METHOD AND SYSTEM FOR DETERMINING PROTECTION LIMITS WITH INTEGRATED EXTRAPOLATION OVER A GIVEN TIME HORIZON

(75) Inventor: Stanislas Szelewa, Paris (FR)

(73) Assignee: Sagem Defense Securite, Paris (FR)

( * ) Notice: Subject to any disclaimer, the term of this patent is extended or adjusted under 35 U.S.C. 154(b) by 151 days.

(21) Appl. No.: 13/393,807

(22) PCT Filed: Sep. 6, 2010

(86) PCT No.: PCT/EP2010/063011
§ 371 (c)(1), (2), (4) Date: May 3, 2012

(87) PCT Pub. No.: WO2011/026961
PCT Pub. Date: Mar. 10, 2011

(65) Prior Publication Data

US 2012/0215376 A1    Aug. 23, 2012

(30) Foreign Application Priority Data

Sep. 7, 2009 (FR) ...................................... 09 56070

(51) Int. Cl.
*G01S 19/20* (2010.01)
*G01C 21/16* (2006.01)

(52) U.S. Cl.
CPC ............... *G01C 21/165* (2013.01); *G01S 19/20* (2013.01)
USPC .............................................. 701/1; 701/469

(58) Field of Classification Search
CPC ....................................................... G01S 19/20
USPC ................................. 701/1, 469; 342/357.58
See application file for complete search history.

(56) References Cited

U.S. PATENT DOCUMENTS 4,148,029 A * 4/1979 Quesinberry ................. 342/106
5,760,737 A * 6/1998 Brenner .................... 342/357.58

(Continued)

FOREIGN PATENT DOCUMENTS

EP    2006707    12/2008
EP    2081043    7/2009

(Continued)

OTHER PUBLICATIONS

Ene, Alexandru, "Utilization of modernized global navigation satellite systems for aircraft-based navigation integrity", Ph.D thesis, Stanford Univeristy, Mar. 2009, 248 pages, downloaded from http://waas.stanford.edu/papers/Thesis/AlexandruEneThesis09.pdf.*

(Continued)

*Primary Examiner* — Behrang Badii
*Assistant Examiner* — David Testardi
(74) *Attorney, Agent, or Firm* — Blakley Sokoloff Taylor & Zafman

(57) ABSTRACT

A method for determining protection limits at a future moment associated with navigation states of a bearer by estimating the navigation states of the bearer at the present moment, developing a statistic model of the estimation errors of navigation states of the bearer at the present moment in the form of a covariance matrix, extrapolating, for a future moment, the statistical model of the estimation errors, calculating protection limits at the future moment from the extrapolated statistical model, the extrapolation of the statistical model of the estimation errors implements the application of a constant and positive transition matrix to a standard deviation vector constructed from the square root of the elements of the diagonal of the covariance matrix, to propagate, up to the future moment, the standard deviations developed at the present moment. The invention also relates to a navigation system configured to implement the method.

11 Claims, 3 Drawing Sheets

(56) References Cited

U.S. PATENT DOCUMENTS

| | | | | |
|---|---|---|---|---|
| 6,057,800 | A * | 5/2000 | Yang et al. | 342/357.31 |
| 6,094,607 | A * | 7/2000 | Diesel | 701/4 |
| 6,298,316 | B1 * | 10/2001 | Diesel | 702/190 |
| 6,408,245 | B1 * | 6/2002 | An et al. | 701/472 |
| 6,417,802 | B1 * | 7/2002 | Diesel | 342/357.31 |
| 6,639,549 | B2 * | 10/2003 | Vanderwerf et al. | 342/357.58 |
| 6,760,663 | B2 * | 7/2004 | Brenner | 701/470 |
| 6,847,893 | B1 * | 1/2005 | Lupash | 701/476 |
| 6,982,669 | B2 * | 1/2006 | Coatantiec et al. | 342/357.62 |
| 7,219,013 | B1 * | 5/2007 | Young et al. | 701/472 |
| 7,436,354 | B2 * | 10/2008 | Lee | 342/357.29 |
| 7,590,589 | B2 * | 9/2009 | Hoffberg | 705/37 |
| 7,783,425 | B1 * | 8/2010 | Hwang et al. | 701/511 |
| 7,956,802 | B1 * | 6/2011 | Hwang et al. | 342/357.58 |
| 8,014,948 | B2 * | 9/2011 | Vanderwerf | 701/469 |
| 8,019,539 | B2 * | 9/2011 | Vanderwerf | 701/471 |
| 8,090,493 | B2 * | 1/2012 | Aso | 701/31.9 |
| 8,131,463 | B2 * | 3/2012 | Lopez et al. | 701/469 |
| 2009/0182493 | A1 * | 7/2009 | McDonald et al. | 701/200 |
| 2009/0182494 | A1 * | 7/2009 | McDonald et al. | 701/200 |
| 2009/0182495 | A1 * | 7/2009 | McDonald et al. | 701/200 |
| 2010/0211315 | A1 * | 8/2010 | Toda | 701/216 |
| 2011/0291887 | A1 * | 12/2011 | Pulford | 342/357.58 |
| 2012/0041676 | A1 * | 2/2012 | Bouniol et al. | 701/472 |

FOREIGN PATENT DOCUMENTS

| | | | |
|---|---|---|---|
| JP | 2008232869 A | * | 10/2008 |
| WO | WO 03/029755 | | 4/2003 |

OTHER PUBLICATIONS

Ene, Alexandru, "Fault detection and elimination for Galileo-GPS vertical guidance", ION NTM 2007, Jan. 22-24, 2007, San Diego, CA, 11 pages, downloaded from http://gps.stanford.edu/papers/EneIONNTM07.pdf.*

Sharif, Massoud, et al., "Integrated approach to predict confidence of GPS measurement", $20^{th}$ ISPRS Congress, Jul. 12-23, 2004 Istanbul, Turkey, downloaded from http://www.itc.nl/library/Papers_2004/peer_conf/sharif.pdf.*

Walter, Todd, et al., "A proposed integrity equation for WAAS MOPS", Proceedings of the 10th International Technical Meeting of the Satellite Division of the Institute of Navigation (ION GPS 1997), Sep. 16-19, 1997, downloaded from http://waas.stanford.edu/~wwu/walter/papers/IONGPS97.pdf.*

* cited by examiner

METHOD AND SYSTEM FOR DETERMINING PROTECTION LIMITS WITH INTEGRATED EXTRAPOLATION OVER A GIVEN TIME HORIZON

This is a non-provisional application claiming the benefit of International Application Number PCT/EP2010/063011 filed Sep. 6, 2010.

The field of the invention is the integrity of a carrier navigation system.

Integrity means the measure of confidence in the navigation states (positions, speeds, attitudes) of the carrier estimated by the navigation system, expressed as a probability that the error between the estimated value and the real value of a navigation state exceeds a protection limit.

The invention relates to a method and a system for determining one or several protection limits associated with one or several navigation states of a carrier, and more precisely is aimed at providing protection limits which are time consistent with the navigation states to be protected.

Conventionally, a carrier such as an aircraft is positioned firstly from data supplied by an onboard measurement unit (for example an inertial control unit or a barometric altimeter) and secondly data derived from GNSS (Global Navigation Satellite System) satellite signals originating from a constellation of satellites in orbit around the earth. Combined processing of these data, for example using a Kalman filter, can determine the state of the aircraft, in other words in particular a precise position, speed and attitude close to the real state of the aircraft.

Between receptions of satellite signals, navigation states of the aircraft are extrapolated or estimated from inertial data applied to the most recent calculated states. The states thus determined are periodically reset each time that satellite signals are received. The precision of the calculated navigation states is strongly affected by a failure of the satellite constellation, in other words a failure of a satellite that would affect the precision of transmitted data and that would not be detected, or a simultaneous failure or consecutive failures of two satellites in the constellation (the risk of a simultaneous failure of three satellites is so low that it is usually neglected).

This is why it is usual to provide the aircraft pilot with a so-called protection limit or volume centred on the calculated position and representative of the precision of this position taking account of the risk of failure of one or two satellites. The global protection volume is a cylinder with a vertical axis defined by its radius and its half-height, usually called the HPL (Horizontal Protection Limit) and VPL (Vertical Protection Limit). The real position of the aircraft, if it does not precisely coincide with the calculated position, has a probability equal to not more than an acceptable safety threshold (or integrity risk) of being outside the global protection volume. This concept of a protection limit can easily be extended to other navigation states (speeds and attitudes).

Integrity thus measures confidence in estimates of navigation states (positions, speeds, attitudes). For a given aircraft navigation state, if the real value does not precisely coincide with the value estimated by the navigation system, it has a probability equal to not more than the integrity risk (typically $10^{-7}$ per hour of flight) of being outside the associated protection limit (positive value consistent with the navigation state considered).

Figure 1:
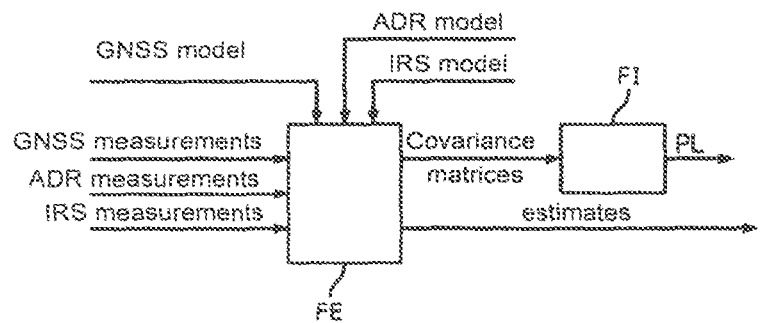
FIG. 1 shows the estimation function FE that uses GNSS satellite measurements and ADR (Air Data Reference) measurements and the integrity function FI that calculates protection limits PL that limit estimation errors.

The integrity calculations based on the combination of statistical models and well known to those skilled in the art, are usually produced from the high level architecture shown in FIG. 1.

This FIG. 1 shows the estimation function FE (usually implemented with a Kalman filter) that uses GNSS satellite measurements, ADR (Air Data Reference) measurements derived for example from a barometric altimeter and IRS (Inertial Reference System) measurements derived from an inertial control unit, and error models associated with these measurements, to create estimates of navigation states (positions, speeds, attitudes) and a model for estimating errors (typically through a covariance matrix). FIG. 1 also shows the integrity function FI that calculates protection limits PL that limit estimation errors. There are several methods for calculating protection limits and document U.S. Pat. No. 5,760,737 contains an example of them.

However, the necessary information processing and the calculation of the protection limits usually take a relatively long time such that the calculated protection volume is provided to the user after a delay. Furthermore, for load calculation reasons, the calculation of the protection volume and updates to it can be made at a lower frequency than the frequency at which the associated navigation states are calculated. This choice leads to a delay between the moment at which the protection volume is validated and the moment at which the user uses the protection volume. The result is that the protection volume provided to the user is no longer valid considering this delay that needs to be minimised, without actually eliminating it.

Thus, while from an operational point of view, estimates of navigation states and associated protection limits should correspond to the same validity time, real time constraints affect the validity of protection limits (which can be affected by a delay up to one calculation cycle of the estimation function). The validity of protection limits can also be affected due to the asynchronism between the different navigation systems (usually three) onboard a single carrier.

In order to satisfy time validity constraints related to inter-navigation system asynchronism, it is planned to extrapolate protection limits so as to calculate a limit to the estimation error that is consistent in time with the navigation states to be protected.

Figure 2:
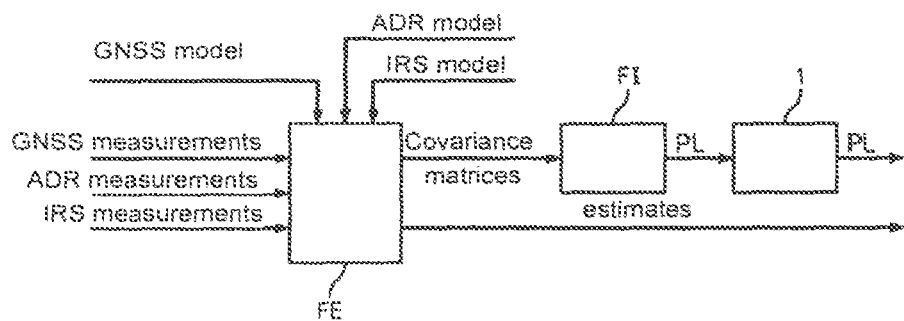
FIG. 2 is a block diagram to show compensation of delays made based on protection limits PL(t).

In this respect, document EP 2 006 707 discloses an extrapolation at the output from the integrity function to compensate for calculation delays and thus satisfy a real time validity constraint. FIG. 2 shows a diagram of the solution recommended in this document. In FIG. 2, the block 1 shows the compensation of delays made according to this document based on protection limits PL(t) determined by the integrity function FI and valid at time t to provide ("extrapolate") a protection limit PL(t+dt) valid at a future moment t+dt.

However, this solution is not fully satisfactory to the extent that it requires a distribution of the integrity risk between navigation states that consumes a non-zero percentage of this risk; the recommended allocation is thus 80% of the risk for position protection limits and 10% of the risk for speed protection limits. Furthermore, this solution is based on purely combinational reasoning, without considering error models although these are known.

Figure 3:
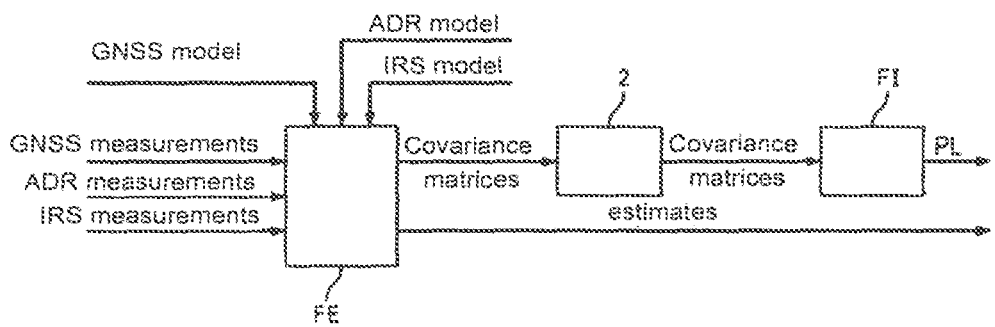
FIG. 3 are error models in which block 2 uses an extrapolation of covariance matrices output from the estimation function FE using the Riccati equation.

One solution taking account of error models is shown in FIG. 3 in which block 2 uses an extrapolation of covariance matrices output from the estimation function FE using the Riccati equation. By similarity with the prediction phase of the Kalman filter algorithm, an immediate formula can be found to extrapolate the covariance matrix. For example, the current transition matrix calculated from the previous dynamics of the carrier can be used. The covariance matrix extrapolated to the future moment is then used by the integrity function FI to calculate the protection limits. Document EP 2 081 043 provides an example of such a solution. As shown in sections [0027]-[0030], the covariance matrix $P_k$ at instant k is extrapolated to the future moment k+1 using $P^-_{k+1} = \Phi_k P_k \Phi_k^T + Q_k$, where $\Phi_k$ represents the state transition matrix at time k, and $Q_k$ represents the noise. The transition matrix $\Phi_k$ is not constant and is applied to the entire covariance matrix $P_k$.

However, this second solution has the following limitations. Firstly, the extrapolation is not integral to the extent that the real time implementation induces the use of a transition matrix calculated with the previous dynamics of the carrier. Furthermore, the associated calculation load may be limiting, particularly in a multi-navigation context involving a bank of estimation filters (each filter excluding one satellite measurement).

The purpose of the invention is to satisfy the time validity constraint of protection limits by using an integral extrapolation of protection limits that overcomes the disadvantages of the techniques described above.

To achieve this purpose, a first aspect of the invention involves a method for determining protection limits at a future moment associated with navigation states of a carrier, including steps consisting of:
 estimating navigation states of the carrier at the present moment,
 producing a statistical model of estimation errors of navigation states of the carrier at the present moment in the form of a covariance matrix,
 extrapolating the statistical model of estimation errors to a future moment,
 calculating protection limits at a future moment using the extrapolated statistical model,
 characterised in that extrapolation of the statistical estimation error model applies a constant positive transition matrix to a standard deviation vector constructed from the square roots of the elements of the diagonal of the covariance matrix to propagate standard deviations of navigation states produced at the present moment, to a future moment.

Some preferred but non-limitative aspects of this method are described below:
 coefficients of the transition matrix are determined based on assumptions of the dynamics of the carrier considered over a time horizon;
 assumptions of the dynamics of the carrier include at least the ground speed, the vertical speed, rotation rate, horizontal and vertical load factor;
 a transition matrix is produced to compensate for the validity delay of the protection limit for estimates of navigation states;
 coefficients of the transition matrix are determined as a function of the maximum dynamics of the carrier over a time horizon corresponding to one calculation cycle of estimates of navigation states;
 a transition matrix is produced to compensate for the validity delay of the protection limit related to asynchronism between different navigation systems onboard the carrier;
 coefficients of the transition matrix are determined as a function of the maximum dynamics of the carrier over a time horizon corresponding to the maximum emission period of the protection limits;
 an extrapolation is made to compensate for the validity delay related to asynchronism between the different navigation systems based on standard deviations previously propagated to the future moment to compensate for the validity delay of the protection limit for estimates of navigation states;
 a transition matrix is produced so that predictive protection limits can be calculated after a specific carrier mission;
 coefficients of the transition matrix are determined as a function of the specific dynamics of the carrier during the mission, over a time horizon corresponding to the duration of the mission.

According to a second aspect, the invention discloses a carrier navigation system comprising:
 an estimation module providing navigation state estimates of the carrier at the present moment and a statistical model for estimation errors of the carrier navigation states at the present moment in the form of a covariance matrix;
 a module to calculate protection limits providing protection limits starting from estimates of navigation states and the statistical estimation errors model,
 characterised in that it comprises an extrapolation module of the statistical model of estimation errors configured to apply a constant positive transition matrix to a vector of standard deviations constructed from the square roots of the elements of the diagonal of the covariance matrix to propagate standard deviations of navigation states produced at the present moment to a future moment, such that the protection limit calculation module calculates the protection limits at the future moment starting from the extrapolated statistical model.

Other aspects, purposes and advantages of this invention will become clear after reading the following detailed description of preferred embodiments of the invention given as non-limitative examples and with reference to the appended drawings in which, apart from FIGS. 1 to 3 discussed above, FIGS. 4 and 5 are diagrams showing different possible embodiments of the method according to this first aspect of the invention.

A first aspect of the invention relates to a method for determining protection limits at a future moment around a position of a carrier. It will be understood that the invention also relates to a carrier navigation system configured so that it will use the method according to the first aspect of the invention. Furthermore, although this description applies to the carrier speed, it will be understood that the invention also includes other navigation states of the carrier (speeds, attitudes) and in this respect it will be remembered that conventionally a protection limit is associated with each navigation state of the carrier.

Figure 4:
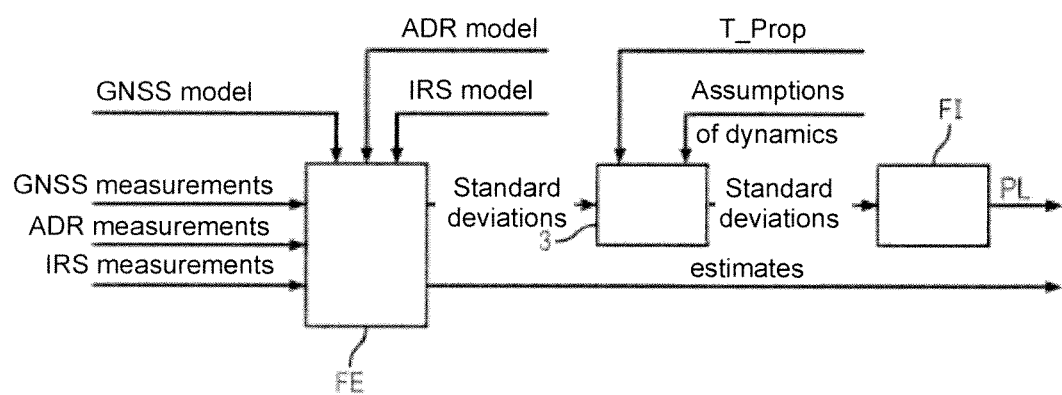
FIG. 4 is an estimation module that estimates the navigation states of the carrier at the present moment (positions, speeds, attitudes) and produces a statistical model of estimation errors of the navigation states.
Figure 5:
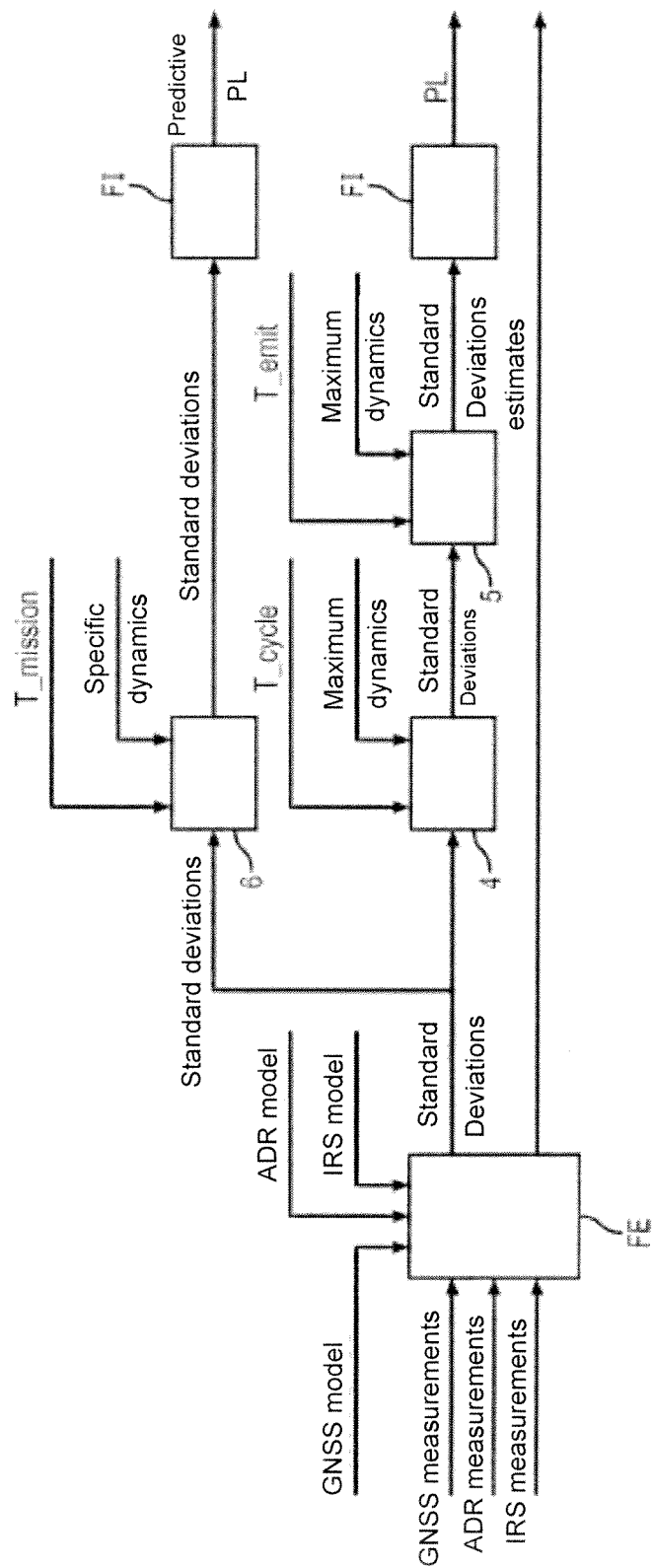
FIG. 5 is a diagram showing different possible embodiments of the method according to this first aspect of the invention.

For the purposes of the invention and with reference to FIGS. 4 and 5, an estimation function FE (implemented by an estimation module, typically a Kalman filter) estimates the navigation states of the carrier at the present moment (positions, speeds, attitudes) and produces a statistical model of estimation errors of the navigation states of the carrier at the present moment in the form of a covariance matrix. As already mentioned, the estimation function FE does this using different measurements (GNSS, ADR and IRS) and error models of these measurements.

The invention proposes to extrapolate the statistical estimation errors model to a future moment using an extrapolation module 3-6 and to calculate protection limits at the future moment from the statistical model extrapolated through a protection limits calculation module that uses the integrity function FI already mentioned.

Before extrapolating the statistical estimation errors model to the future moment, the invention proposes that a constant positive transition matrix (called the "conservative" matrix) should be applied to a vector of standard deviations constructed from the square roots of elements of the diagonal of the covariance matrix to propagate standard deviations of navigation states produced at the present moment to the future moment.

It will be remembered that the diagonal of the covariance matrix consists of the variance of each of the navigation states, in other words the square of the standard deviation of each of the navigation states.

The invention satisfies various time validity constraints in that the transition matrix can be configured as a function of the time horizon considered and the dynamics of the carrier over this horizon.

According to one possible embodiment of the invention, the coefficients of the transition matrix are thus determined as a function of the assumptions of the dynamics made for the carrier considered over a time horizon.

The transition matrix is derived from the transition matrix of the Kalman filter but its coefficients are positive and maximum (in the sense of a set of assumptions of carrier dynamics). The value of the coefficients may depend particularly on the following assumptions of dynamics:

Ground speed (possibly maximum), vertical speed (possibly maximum);
Rotation rate (possibly maximum);
Horizontal and vertical load factor (possibly maximum);
And the extrapolation time considered.

Note that by applying an extrapolation to the inputs of the integrity function FI, the invention does not imply a specific allocation of the integrity risk between navigation states, unlike the solution in FIG. 1 that does propose an extrapolation of the outputs of the integrity function. This means (for the fixed extrapolation constraint) that the size of the protection limits can be reduced and consequently availability relative to given alert limits can be increased.

Furthermore, by using a constant positive ("conservative") transition matrix, the extrapolation made in the framework of the invention is integral in the sense of the given set of assumptions of carrier dynamics (for example maximum carrier dynamics). In particular, and unlike the solution in solution in FIG. 2 for which an example is given in document EP 2 081 043, the extrapolation according to the invention does not use the dynamic data of the carrier from the previous calculation cycle and is thus independent of the previous dynamics of the carrier.

Finally, in being applicable only to a standard deviations vector constructed from the square roots of elements of the diagonal of the covariance matrix, the invention presents an optimised algorithmic complexity (particularly compared with the double matrix product of the extrapolation using Riccati's equation).

FIG. 5 shows a possible embodiment of the invention in which the integral extrapolation of standard deviations for the calculation of protection limits is done several times to satisfy different time validity constraints. However, it will be understood that each extrapolation presented in the following can be used independently, or alongside other types of extrapolation.

A first extrapolation is made by an extrapolation module 4 using a transition matrix produced so as to compensate for the validity delay of protection limits relative to estimates of navigation states.

This delay induced by the real time implementation of the Kalman filter algorithm usually introduces one Kalman cycle of delay in the validity of the covariance matrix and consequently in the validity of the protection limits constructed from this covariance matrix.

The coefficients of the transition matrix are determined more precisely depending on the maximum dynamics of the carrier over a time horizon T_cycle corresponding to one calculation cycle of the estimates of the navigation states. Standard deviations at time t are thus extrapolated (aged) to a future moment t+T_cycle assuming that during the interval, the dynamics of the carrier are necessarily limited by its maximum dynamics.

A second extrapolation is made through an extrapolation module 5 using a transition matrix produced so as to compensate for the validity delay of the protection limits related to asynchronism between the different onboard navigation systems within the carrier. In FIG. 5, this second extrapolation is made based on standard deviations extrapolated by the extrapolation module 5 compensating for real time calculation delays. However, it will be understood that the compensation of inter-system navigation asynchronisms cannot be implemented independently of the compensation for real time calculation delays, based on standard deviations directly at the output from the estimation function FE.

The calculation of consolidated protection limits between asynchronous navigation systems will lead to a validity delay equal to not longer than the emission period of the protection limits. The coefficients of the transition matrix are thus determined as a function of the maximum dynamics of the carrier over a time horizon T_emit corresponding to the period at which protection limits are emitted. Standard deviations at time t are thus extrapolated (aged) to the future time (t+T_emit), considering that the carrier has dynamics necessarily limited by its maximum dynamics during the interval.

A third extrapolation is made by an extrapolation module 6 using a transition matrix produced so as to enable the calculation of predictive protection limits after a specific mission of the carrier.

Modern aviation effectively requires the calculation of predictive protection limits in the framework of a specific mission (for example half turn). Coefficients of the transition matrix are thus determined as a function of the specific dynamics of the carrier during the mission (the dynamics typically being specified by the aircraft manufacturer, for example a maximum roll rate during a half-turn) over a time horizon T_mission corresponding to the duration of the mission (for example making a half-turn). Standard deviations at time t are thus extrapolated (aged) to the future moment (t+T_mission) considering that the dynamics of the carrier within this interval are limited by said specific dynamics.

The invention claimed is:
1. Method for determining protection limits at a future moment associated with navigation states of a carrier comprising:

measuring data on navigation states of the carrier through sensors of the carrier;

based on said measured data, estimating, with an estimating filter, navigation states of the carrier at the present moment, producing a statistical model of estimation errors of navigation states of the carrier at the present moment in the form of a covariance matrix, extrapolating the statistical model of estimation errors to a future moment, wherein said extrapolating comprising a multiplication of:

a transition matrix, with constant and positive coefficients, with a standard deviation vector constructed from the square roots of the elements of the diagonal of the covariance matrix of the estimating filter, in order to propagate standard deviations of the navigation states produced at the present moment, to a future moment, the propagation of standard deviations of navigation states being independent from previous dynamics of the carrier, and calculating a protection limit at the future moment using the extrapolated statistical model.

2. Method according to claim 1, in which the coefficients of the transition matrix are determined based on assumptions of the maximum dynamics of the carrier considered over a time horizon.

3. Method according to claim 2, in which the assumptions of the maximum dynamics of the carrier include at least assumption of the maximum values of the ground speed, the vertical speed, rotation rate, horizontal and vertical load factors.

4. Method according to one of claims 1 to 3, wherein:

the covariance matrix of the estimating filter has a validity which is delayed with respect to the estimate of the navigation states, which causes, in the absence of the transition matrix, a validity delay of the protection limit, and the coefficients of the transition matrix are computed so that the protection limit, calculated at the future moment using the extrapolated statistical model which comprises the transition matrix, does not comprise this validity delay.

5. Method according to claim 4, in which the coefficients of the transition matrix are determined as a function of the maximum dynamics of the carrier over a time horizon corresponding to one calculation cycle of estimates of navigation states.

6. Method according to one of claims 1 to 3, wherein:

the carrier comprises navigation systems which are not synchronized, which causes, in the absence of the transition matrix, a validity delay of the protection limit, and the coefficients of the transition matrix are computed so that the protection limit, calculated at the future moment using the extrapolated statistical model which comprises the transition matrix, does not comprise said validity delay.

7. Method according to claim 6, in which the coefficients of the transition matrix are determined as a function of the maximum dynamics of the carrier over a time horizon corresponding to the maximum emission period of the protection limits.

8. Method according to claim 6, in which the extrapolation is made to compensate for the validity delay related to asynchronism between the different navigation systems based on standard deviations previously propagated to the future moment to compensate for the validity delay of the protection limit for estimates of navigation states.

9. Method according to claim 8, wherein:

the covariance matrix of the estimating filter has a validity which is delayed with respect to the estimate of the navigation states, which causes, in the absence of the transition matrix, a validity delay of the protection limit, and the coefficients of the transition matrix are computed so that the protection limit, calculated at the future moment using the extrapolated statistical model which comprises the transition matrix, does not comprise this validity delay.

10. Method according to one of claims 1 to 3, in which the coefficients of the transition matrix are determined as a function of specific dynamics of the carrier during a mission, over a time horizon corresponding to the duration of the mission.

11. Carrier navigation system comprising:

an estimation module providing navigation state estimates of the carrier at the present moment and a statistical model for estimation errors of the carrier navigation states at the present moment in the form of a covariance matrix, a protection limits calculation module to calculate protection limits providing protection limits starting from estimates of navigation states and the statistical estimation errors model, and an extrapolation module to extrapolate the statistical model of estimation errors configured to multiply a transition matrix with constant and positive coefficients to a vector of standard deviations constructed from the square roots of the elements of the diagonal of the covariance matrix, in order to propagate standard deviations of navigation states produced at the present moment to a future moment, the propagation of standard deviations of navigation states being independent from previous dynamics of the carrier, such that the protection limits calculation module calculates the protection limits at the future moment starting from the extrapolated statistical model.

* * * * *